(12) United States Patent
Marino et al.

(10) Patent No.: US 7,319,308 B2
(45) Date of Patent: Jan. 15, 2008

(54) DC/DC CONVERTER

(75) Inventors: Filippo Marino, Tremestieri Etneo (IT); Marco Minieri, San Giovanni La Punta (IT); Giuseppe Maria Di Blasi, Trapani (IT); Giovanni Genco Russo, San Cataldo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 122 days.

(21) Appl. No.: 11/253,077

(22) Filed: Oct. 18, 2005

(65) Prior Publication Data

US 2006/0087296 A1 Apr. 27, 2006

(30) Foreign Application Priority Data

Oct. 19, 2004 (IT) .......................... MI2004A1981

(51) Int. Cl.
*G05F 1/652* (2006.01)

(52) U.S. Cl. ...................................... 323/222; 323/286

(58) Field of Classification Search ................ 323/222, 323/282, 283–288, 272, 290, 271, 266; 363/17, 363/26, 56.07
See application file for complete search history.

(56) References Cited

U.S. PATENT DOCUMENTS 6,642,696 B2 * 11/2003 Tateishi ...................... 323/222

* cited by examiner

*Primary Examiner*—Rajnikant B. Patel
(74) *Attorney, Agent, or Firm*—Lisa K. Jorgenson; Robert Iannucci; Seed IP Law Group PLLC

(57) ABSTRACT

A DC/DC converter includes a first switchcoupled to an input voltage and to a reference voltage. The first switch is suitable for driving a load connected to the output terminal of the DC/DC converter. The DC/DC converter includes an inductor having an intrinsic resistance and being connected to a terminal of the first switch, and a control circuit suitable for generating a driving signal of the first switch at a switching pulse. The control circuit has a first input terminal connected to the output terminal of the DC/DC converter. The DC/DC converter comprises a resistive element and a capacitor connected between the terminal of the first switch and the reference voltage. The control circuit has a second input terminal connected with the terminal in common of the capacitor and of the resistance.

19 Claims, 4 Drawing Sheets

DC/DC CONVERTER

BACKGROUND OF THE INVENTION

1. Field of the Invention

The present invention refers to a DC/DC converter.

2. Description of the Related Art

Converters of direct current into direct current, known as DC/DC converters, are generally known in the prior art. Said converters are of the switching type and they supply voltage regulated at a load by means of switching the current flow in an inductor coupled to the load.

A buck converter is a type of DC/DC converter that uses power transistors, such as MOS, to control the current flow in the output inductor. A first transistor called "high side" couples the inductor with the supply voltage while a second transistor called "low side" connects the inductor to ground. A drive circuit in PWM (Pulse Width Modulation) mode is used to drive the first and the second transistors in alternated mode. A diode can be used in place of the low side transistor.

To regulate the performance of a DC/DC converter the current sent to the load is measured. This information enables the load to be protected against overload currents, ensures control during the variations of the load and permits, in the case of multiphase converters, the balancing of the currents of the single phases.

A technique for measuring this current consists in using sense resistors arranged in series with the output inductor; the voltage from which the current is obtained is measured at the terminals of the sense resistance. The resistance should have a certain value to supply an accurate measurement; nevertheless a value of the sense resistance that is too high would lower the efficiency of the converter and would lead to problems of dissipation of heat due to the resistance.

Alternatively, the sense resistance is placed in series with one of the transistors of the converter with a terminal connected to the supply voltage or to ground. In this manner higher efficiency is obtained given that the average current that flows in the sense resistor is less than the current that flows on the load. In high-frequency applications the disturbances caused by the switching of the transistors have to be eliminated and this implies the introduction of a more complex control circuitry.

Another technique to measure the current on the load consists of positioning a series of a resistance and a capacitor in parallel with the inductor. The current in the inductor has one alternating and one direct component; the alternating component depends on the value of the inductor and on the resistance of the inductor. By suitably tuning the series of the capacitor and the resistance so that their product is equal to the ratio of the value of the inductor on the resistance of the inductor, the current on the inductor can be measured by measuring the voltage on the capacitor, without introducing losses. This technique presents some difficulties linked to tuning the series of the resistance and the capacitor and to the low immunity to noise that the voltage measured on the capacitor presents.

BRIEF SUMMARY OF THE INVENTION

One embodiment of the present invention provides a DC/DC converter that is easier to produce compared with the known ones and that presents better performances in high-frequency use.

The DC/DC converter includes a first switch coupled to an input voltage and to a reference voltage. The first switch is suitable for driving a load connected to the output terminal of the DC/DC converter. The DC/DC converter includes at least one inductor having an intrinsic resistance and being connected to a terminal of the first switch, and at least one control circuit suitable for generating at least one driving signal of the first switch at a desired switching pulse, the control circuit having an input terminal connected to the output terminal of the DC/DC converter. The DC/DC converter also includes a resistance and a capacitor connected between the terminal of the first switch and the reference voltage. The inverse of the product of said the resistance and capacitances of the resistance and the capacitor is lower than the switching pulse and higher than the ratio of the intrinsic resistance of the inductor to the inductance of the same inductor. The control circuit also has a further input terminal coupled with the terminal in common of the capacitor and the resistance.

BRIEF DESCRIPTION OF THE SEVERAL VIEWS OF THE DRAWINGS

The characteristics and advantages of the present invention will appear evident from the following detailed description of embodiments thereof, illustrated as non-limiting examples in the enclosed drawings, in which.

DETAILED DESCRIPTION OF THE INVENTION

Figure 1:
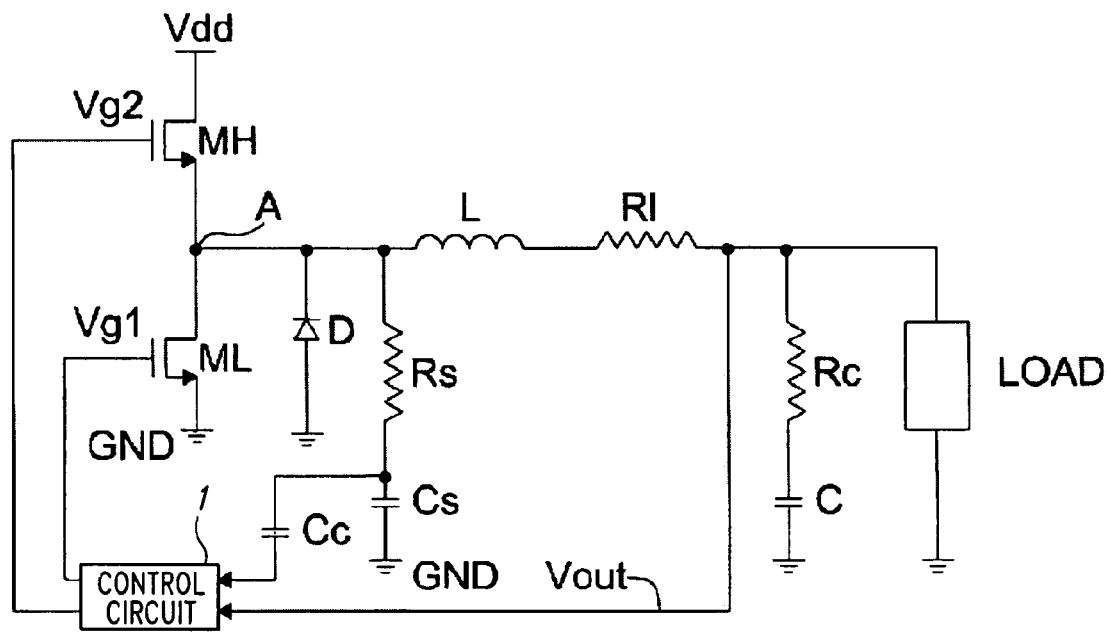
FIG. 1 shows a DC/DC converter according to the first embodiment of the present invention.

With reference to FIG. 1 a DC/DC converter according to a first embodiment of the present invention is shown. The DC/DC converter comprises a MOS transistor MH having a drain terminal connected to the supply voltage Vdd and a source terminal connected to drain terminal of another MOS transistor ML having a source terminal connected to ground. The drain terminal A of the transistor ML is coupled to a load LOAD by means of an inductor L having an internal resistance Rl. A capacitor C is connected in parallel with the load LOAD and presents an internal resistance Rc. A resistance Rs and a capacitor Cs are connected between the drain terminal of the transistor ML and ground GND. The voltage Vs measured at the terminals of the capacitor Cs and the output voltage Vout at the terminals of the load LOAD are in input to the control device 1; the latter supplies the signals Vg1 and Vg2 to the gate terminals of the transistors MH and ML at a switching pulse ω.

The capacitor Cs and the resistance Rs are selected so that the inverse of their product is lower than the switching pulse ω and is greater than the ratio between the intrinsic resistance Rl and the inductance of the inductor, that is $$\frac{Rl}{L} < \frac{1}{RsCs} \ll \omega.$$

In this manner an injection signal Vs is obtained that can be used by the device 1 to generate the control signals Vg1 and Vg2 at the frequency $f=\omega/2\pi$.

Figure 2:
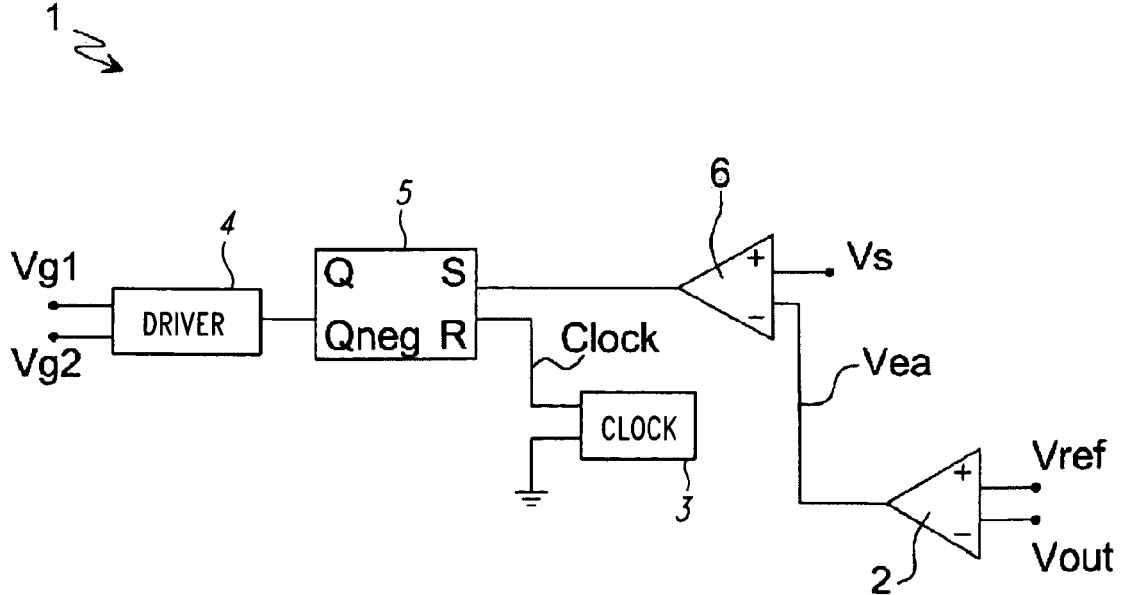
FIG. 2 shows the control device of FIG. 1 more in detail.

In FIG. 2 the control device 1 of FIG. 1 is shown more in detail. Said control device 1 comprises an operational error amplifier 2 having the inverting terminal connected with the voltage Vout and the non-inverting terminal connected with the reference voltage Vref. The voltage signal Vs on the capacitor Cs is a saw-tooth voltage signal; in fact the branch point A varies between the supply voltage Vdd and ground and sizing the capacitor Cs and the resistance Rs so that $$\frac{Rl}{L} < \frac{1}{RsCs} << \omega,$$

a voltage Vs is obtained that reproduces the time path of the current in the inductance and an excellent saw-tooth voltage for the control.

Figure 3:
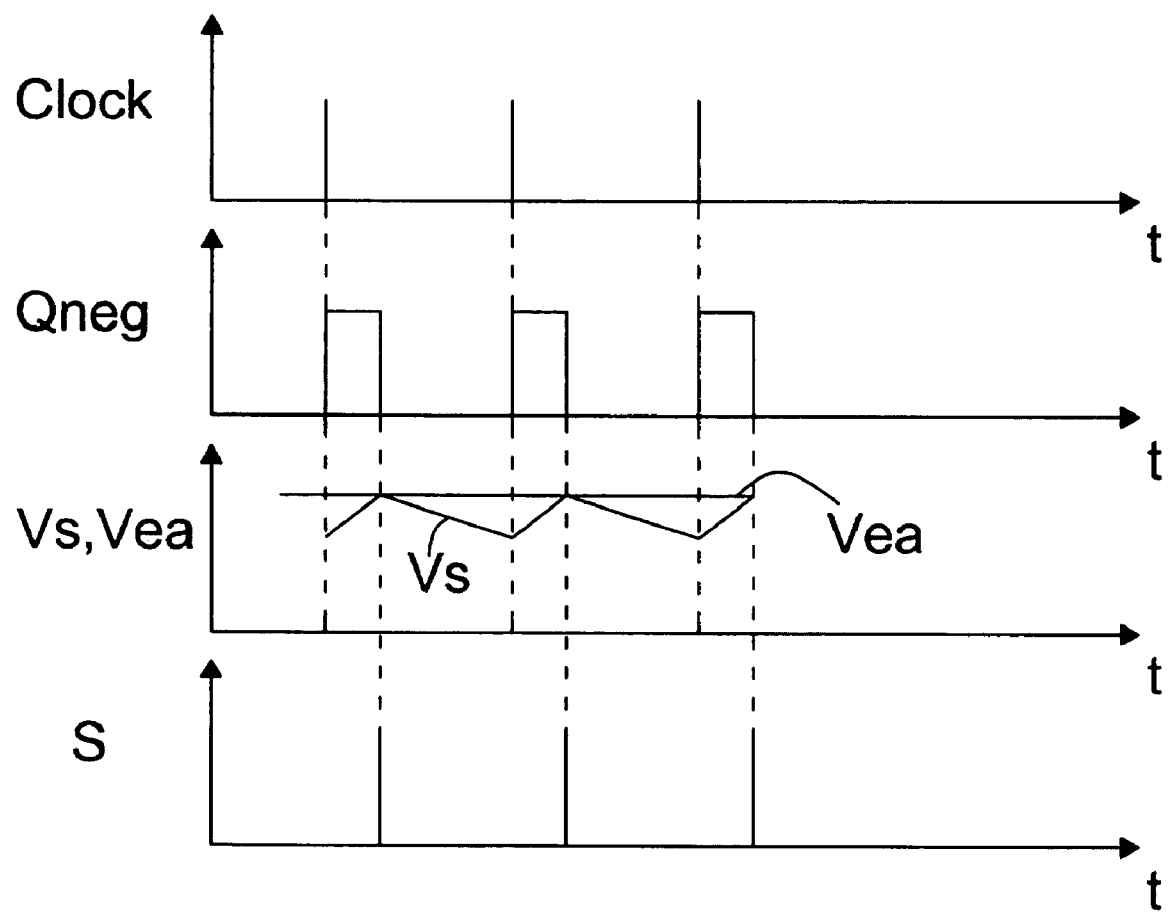
FIG. 3 shows time diagrams of the signals pertaining to the circuit of FIG. 1.

The instant the transistor MH is turned on is determined by a clock device 3 suitable for generating a clock signal Clock whose frequency is equal to the switching frequency f. The turning-off of the transistor MH is determined by the intersection of the signal Vea in output from the error amplifier 2 and the signal Vs; said two signals are in input respectively to the inverting terminal and to the non-inverting terminal of a comparator 6. The signal Vea depends on the signals Vref and Vout while the signal Vs is proportional to the current that circulates in the inductor L and is constituted by a direct component and by an alternating component, as can be seen in FIG. 3.

The device 1 comprises a flip-flop set-reset 5 whose set signal S is the signal in output to the comparator 6 while the reset signal R is the clock signal Clock of the device 3. The flip-flop 5 has an output Q and the negated output Qneg; the output Qneg is in input to another device 4 suitable for driving the transistors MH and ML by means of the signals Vg1 and Vg2.

With this type of DC/DC converter better immunity to the disturbances of the measured voltage Vs is obtained compared to known DC/DC converters. In fact at the terminals of the capacitor Cs there will be an alternating component Vsa of the voltage proportional to the current that flows through the inductor L and given by $$Vsa = i_L \times \frac{L}{Rs \times Cs}$$

where iL is the current that flows through the inductor L. Selecting the greatest value L(RsCs) of the resistance Rl there is greater immunity to noise; this is possible by selecting sufficiently low values of the resistance Rs and of the capacitor Cs.

Figure 4:
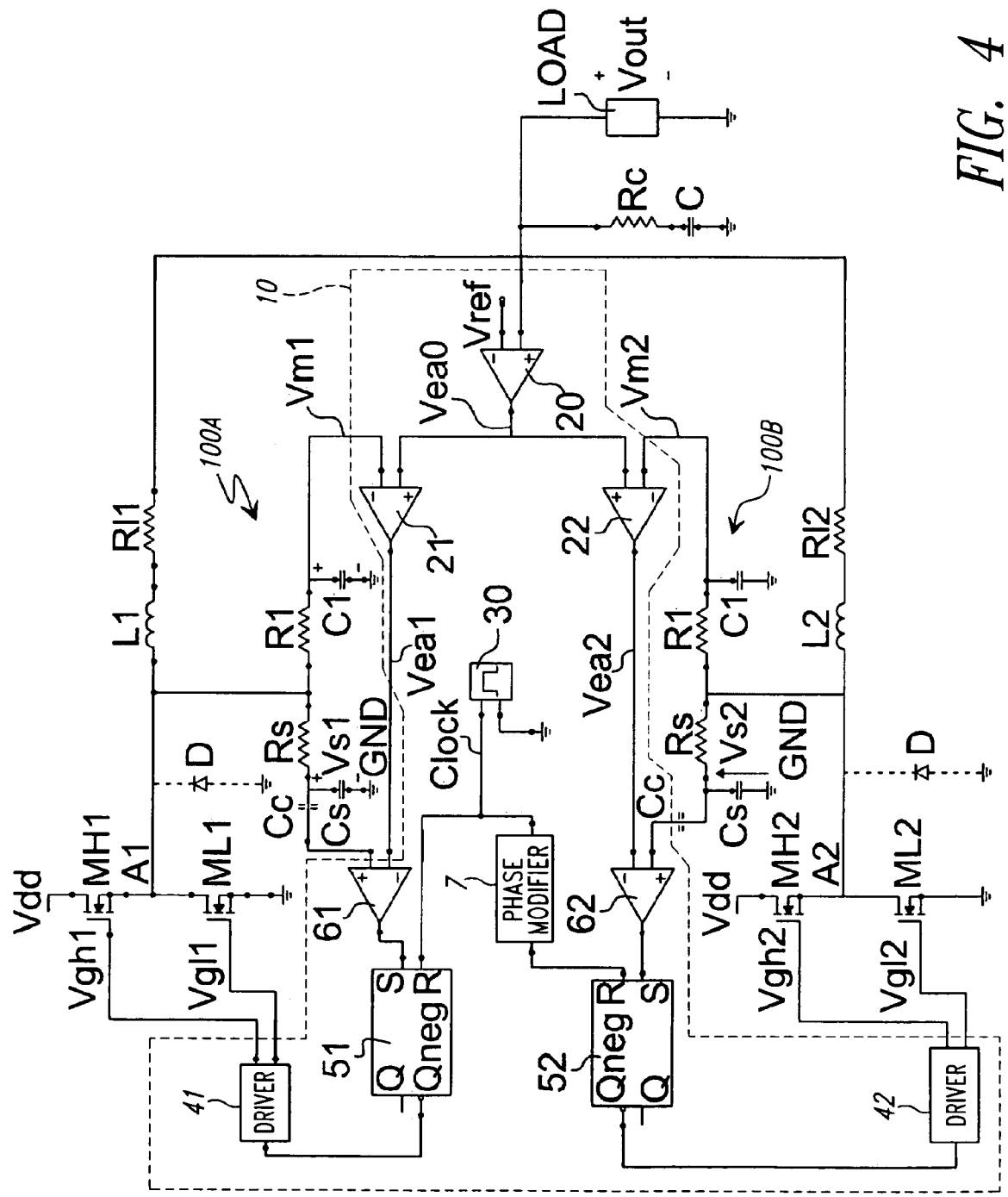
FIG. 4 shows a DC/DC converter according to a second embodiment of the present invention.

In FIG. 4 a DC/DC converter according to a second embodiment of the present invention is shown. Differently from the first embodiment the converter is a multiphase converter and comprises two couples of MOS transistors MH1, ML1 and MH2, ML2. The MOS transistors MH1, MH2 have the respective drain terminals connected to the supply voltage Vdd, the source terminals connected to the respective drain terminals of the MOS transistors ML1, ML2 that have the source terminals connected to ground GND. The drain terminals A1, A2 of the transistors ML1, ML2 are coupled to a load LOAD by means of two inductors L1, L2 having an intrinsic resistance Rl1, Rl2 and to a capacitor C having an intrinsic resistance Rc. The DC/DC converter of FIG. 4 comprises a control device 10 that supplies the signals Vgh1, Vgl1 and Vgh2, Vgl2 for driving the MOS transistors MH1, ML1 and MH2, ML2.

The control device 10 comprises an operational error amplifier 20 having the inverting terminal connected with the voltage Vout and the non-inverting terminal connected with the reference voltage Vref. The control device 10 also comprises two more operational error amplifiers 21 and 22 having in input on the non-inverting terminal the signal Vea0 in output from the amplifier 20 and on the inverting terminal the voltages Vm1 and Vm2.

The instant the transistors MH1, MH2 are turned on is determined by a clock device 30 suitable for generating a clock signal Clock whose frequency is equal to the switching frequency f; more precisely the turning-on of the transistor MH1 is determined by the signal Clock while the turning-on of the transistor MH2 is determined by the signal Clock counter-phased by 180° by a phase modifier 7. The turning-off of the transistors MH1 and MH2 is determined by the intersection of the signals Vea1, Vea2 in output from the error amplifiers 21, 22 and the signals Vs1, Vs2; said signals are in input respectively to the inverting terminal and to the non-inverting terminal of two comparators 61, 62. The signals Vea1, Vea2 depend on the signals Vm1, Vm2 and Vea0 while the signals Vs1, Vs2 are proportional to the current that circulates in the inductors L1, L2 and are constituted by a direct component and by an alternating component.

The device 10 comprises two set-reset flip-flops 51, 52 whose set signals S are the signals in output to the comparators 61, 62 while the reset signals R are the clock signal Clock and the clock signal counter-phased by 180°. The flip-flops 51, 52 have an output Q and the negated output Qneg; the output Qneg is in input to the devices 41, 42 suitable for driving the transistors MH1, ML1 and MH2, ML2 by means of the signals Vgh1, Vgl1 and Vgh2, Vgl2.

The DC/DC converter comprises means 100A, 100B for generating the signals Vm1, Vm2 indicative of the variation of the average current on the respective inductors L1 and L2. The means 100A, 100B can each be constituted by a capacitor C1 and a resistance R1 positioned between the terminals A1, A2 and ground. The capacitor C1 and resistance R1 are sized in such a manner that the product of the resistance R1 for the capacitor C1 is very high, that is $$\frac{Rl1}{L1} > \frac{1}{R1C1} \text{ and } \frac{Rl2}{L2} > \frac{1}{R1C1}.$$

Two more sets of a resistance Rs and a capacitor Cs are connected between the terminals A1, A2 and ground GND; the capacitor Cs and the resistance Rs are selected in such a manner that the inverse of their product is lower than the switching pulse and is greater than the ratio between the inductor L1, L2 and the intrinsic resistance Rl1, Rl2 that is $$\frac{Rl1}{L1} < \frac{1}{RsCs} << \omega \text{ and } \frac{Rl2}{L2} < \frac{1}{RsCs} << \omega.$$

In this manner injection signals Vs1, Vs2 are obtained that can be used by the device 10 to generate the control signals Vgh1, Vgl1 and Vgh2, Vgl2 at the frequency $f=\omega/2\pi$.

The DC/DC converters shown in the Figures eliminate the presence of additional dissipative elements arranged in series with one of the transistors used for driving the load and through which high currents flow.

According to a variant to the first and second embodiments of the present invention, it is possible to replace the low side transistors ML, ML1, ML2 with a diode D having a cathode connected to the source terminal of the high side transistor MH, MH1 and MH2 and an anode connected to ground GND, as shown in dotted lines in the FIGS. 1 and 4.

Figure 5:
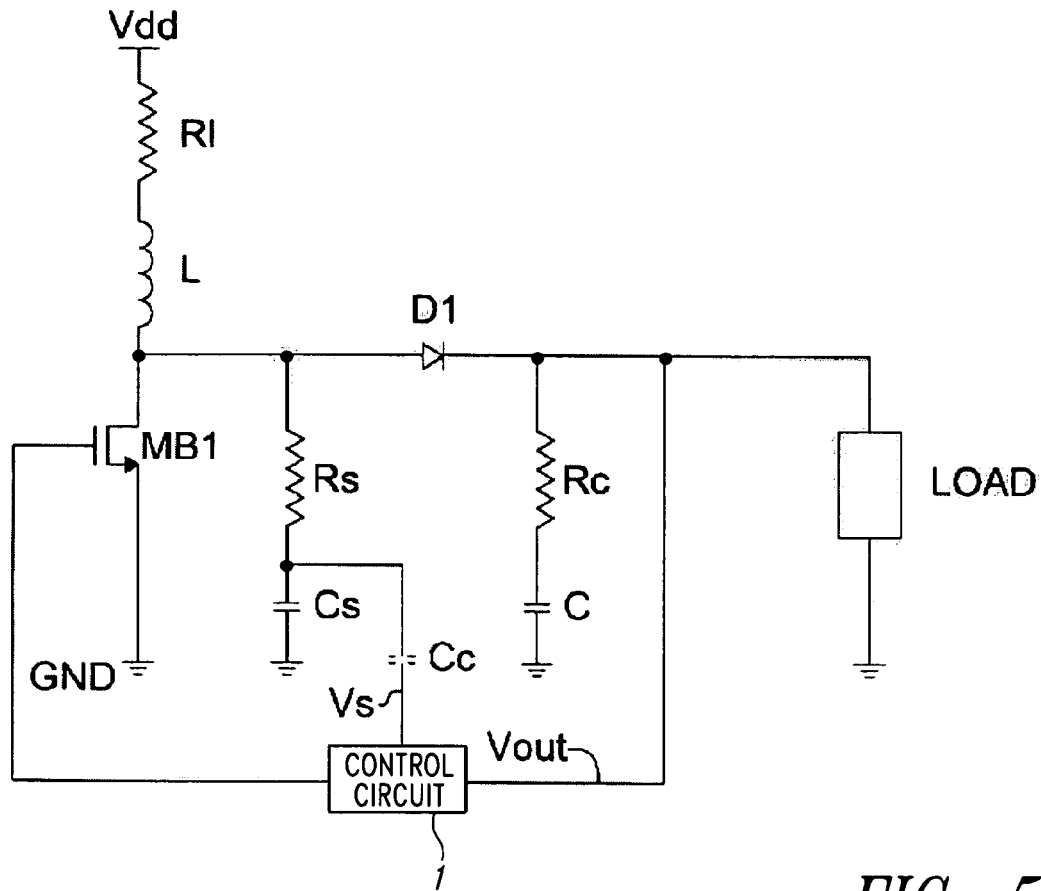
FIG. 5 shows a DC/DC converter according to a third embodiment of the present invention.

With reference to FIG. 5 a DC/DC converter according to a third embodiment of the present invention is shown; the elements that are the same as the first embodiment will be indicated with the same numerical references. The DC/DC converter comprises a MOS transistor MB1 having a drain terminal coupled to the supply voltage Vdd by means of a real inductor L having an intrinsic resistance Rl and a source terminal connected to ground. The drain terminal of the transistor MB1 is coupled to a load LOAD by means of a diode D1. A capacitor C is connected in parallel with the load LOAD and presents an internal resistance Rc. Connected between ground GND and the drain terminal of the transistor MB1 are a resistance Rs and a capacitor Cs. The voltage Vs measured at the terminals of the capacitor Cs and the output voltage Vout at the terminals of the load LOAD are in input to the control device 1; the latter supplies the signal Vg1 to the gate terminal of the transistor MB1 at a required switching pulse ω.

The capacitor Cs and the resistance Rs are selected in such a manner that the inverse of their product is lower than the switching pulse ω and is greater than the ratio between the intrinsic resistance Rl and the inductor L, that is $$\frac{Rl}{L} < \frac{1}{RsCs} << \omega.$$

In this manner a saw-tooth signal Vs is obtained that can be used by the device 1 to generate the control signal Vg1 at the frequency f=ω/2π.

Figure 6:
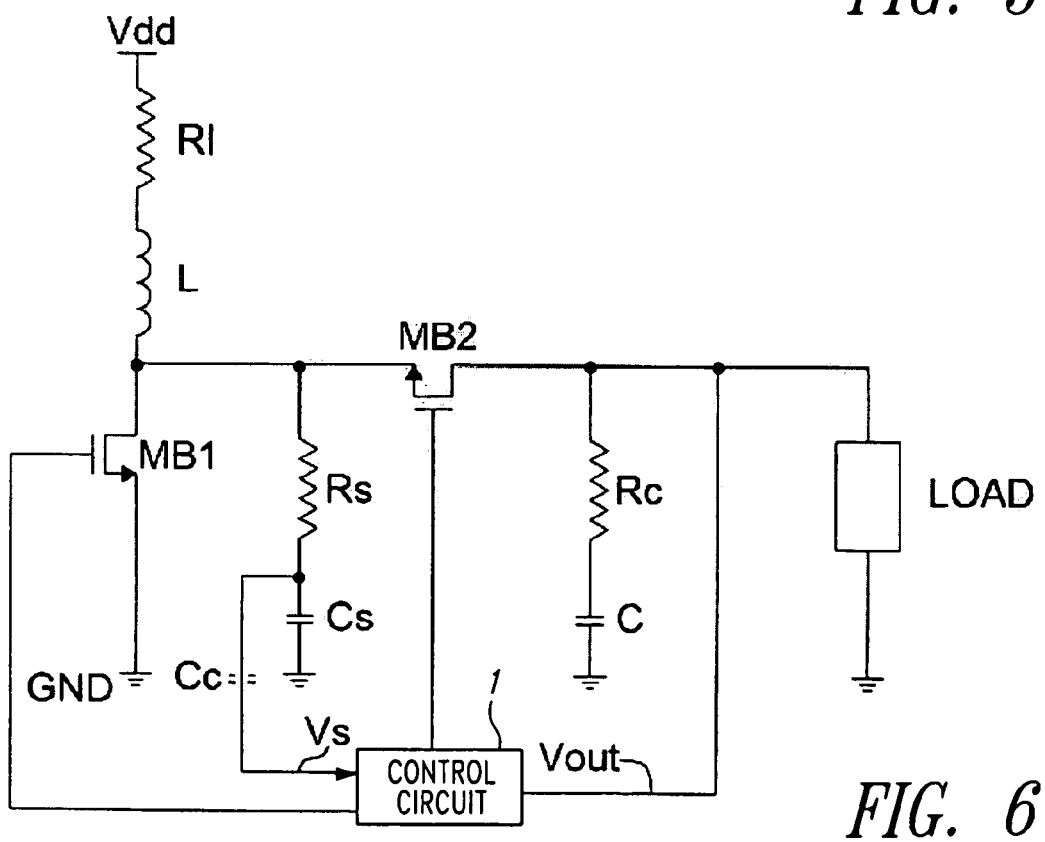
FIG. 6 shows a DC/DC converter according to a variant to the third embodiment of the present invention.

With reference to FIG. 6 a variant to the third embodiment of the present invention is shown. The difference of the DC/DC converter of said variant lies in the presence of a transistor MB2 in the place of the diode D1; the transistor MB2 is driven by the device 1.

Preferably in the DC/DC converter of all the embodiments described, another capacitor Cc is present between the input terminal of the control device 1, 10 and the common terminal of the resistance Rs and the capacitor Cs, suitable for eliminating the direct component of the voltage signal Vs, as shown by a dotted line in FIGS. 1, 4-6; said voltage signal Vs becomes in this manner independent from the output voltage and the current on the load LOAD.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A DC/DC converter, comprising:
    an output terminal;
    a first switch coupled to an input voltage and to a reference voltage, said first switch having a terminal and being suitable for driving a load connected to the output terminal of said DC/DC converter;
    a first inductor having an intrinsic resistance and being connected to the terminal of said first switch;
    a control circuit suitable for generating a driving signal of said first switch at a switching pulse, said control circuit having a first input terminal connected to the output terminal of said DC/DC converter;
    a first resistive element and a first capacitor connected between said terminal of said first switch and said reference voltage, the first resistive element and first capacitor being connected to one another at a common terminal and having a resistance and a capacitance, respectively, that are sized such that an inverse of a product of said resistance and capacitance are lower than an angular frequency of said switching pulse and are higher than a ratio of the intrinsic resistance to inductance of the first inductor, said control circuit having a second input terminal coupled with the common terminal of the first capacitor and of the first resistive element.

2. The converter according to claim 1, further comprising a second switch having a terminal connected to the terminal of said first switch and being connected to said reference voltage, said second switch being driven by said control circuit.

3. The converter according to claim 1, further comprising a diode having a first terminal connected to the terminal of said first switch and a second terminal connected to said reference voltage.

4. The converter according to claim 1 wherein said control circuit comprises:
    an operational error amplifier having first and second inputs connected to the output terminal of the DC/DC converter and a further reference voltage, respectively, and an output terminal; and
    a comparator having a first input connected to the common terminal of the first capacitor and first resistive element, and a second input coupled to the output terminal of said error amplifier.

5. The converter according to claim 1, further comprising a further capacitor with intrinsic resistance connected to the output terminal of the converter and to said reference voltage.

6. The converter according to claim 1 wherein said reference voltage is ground.

7. The converter according to claim 1, further comprising:
    a second switch having a terminal connected to the terminal of said first switch and being connected to said reference voltage, said second switch being driven by said control circuit;
    a third switch coupled to the input voltage and to the reference voltage, said third switch having a terminal and being suitable for driving the load;
    a fourth switch having a terminal connected to the terminal of said third switch and being connected to said reference voltage, said fourth switch being driven by said control circuit;
    a second inductor having an intrinsic resistance and being connected to the terminal of said third switch; and
    a second resistive element and a second capacitor connected between said terminal of said third switch and said reference voltage, the second resistive element and second capacitor being connected to one another at a common terminal;

wherein said control circuit comprises:
a first error amplifier having first and second inputs connected to the output terminal of the DC/DC converter and a further reference voltage, respectively, and an output terminal;
a first comparator having a first input connected to the common terminal of the first capacitor and first resistive element, and a second input coupled to the output terminal of said first error amplifier; and
a second comparator having a first input connected to the common terminal of the second capacitor and second resistive element, and a second input coupled to the output terminal of said first error amplifier.

8. The converter according to claim 7, further comprising:
a third resistive element and a third capacitor connected between said terminal of said first switch and said reference voltage, the third resistive element and third capacitor being connected to one another at a common terminal and having a resistance and a capacitance, respectively, that are sized such that an inverse of a product of said resistance of the third resistive element and the capacitance of said third capacitor are lower than a ratio of the intrinsic resistance to inductance of said first inductor; and
a fourth resistive element and a fourth capacitor connected between said terminal of said third switch and said reference voltage, the fourth resistive element and fourth capacitor being connected to one another at a common terminal and having a resistance and a capacitance, respectively, that are sized such that an inverse of a product of said resistance of the fourth resistive element and the capacitance of said fourth capacitor are lower than a ratio of the intrinsic resistance to inductance of said second inductor, said control circuit comprising:
a second error amplifier having a first input terminal connected with the common terminal of the third capacitor and third resistive element, a second input terminal connected directly with the output of said first error amplifier, and an output terminal; and
a third error amplifier having a first input terminal connected with the common terminal of the fourth capacitor and fourth resistive element, a second input terminal connected directly with the output of said first error amplifier, and an output terminal.

9. The converter according to claim 8, wherein the second input terminals of said first and second comparators are connected to the output terminals of said second and third error amplifiers, respectively.

10. The converter according to claim 9, wherein said control circuit comprises means suitable for driving the first and second switches in counter-phase with respect to the third and fourth switches.

11. The converter according to claim 1, further comprising a further capacitor connected between said second input terminal of the control circuit and the common terminal of the first capacitor and first resistive element.

12. A DC/DC converter, comprising:
an output terminal;
a first switch coupled to an input voltage and to a reference voltage, the first switch having a terminal;
a first inductor having an intrinsic resistance and being connected to the terminal of the first switch;
a first resistive element and a first capacitor connected between the terminal of the first switch and the reference voltage, the first resistive element and first capacitor being connected to one another at a common terminal; and
a control circuit having a first input terminal coupled to the output terminal of the DC/DC converter, a second input terminal coupled to the common terminal of the first capacitor and the resistive element; and a first output coupled to a control terminal of the first switch.

13. The converter of claim 12, further comprising a second switch having a terminal connected to the terminal of the first switch and being connected to the reference voltage, the second switch having a control terminal coupled to a second output of the control circuit.

14. The converter of claim 12, further comprising a diode having a first terminal connected to the terminal of the first switch and a second terminal connected to the reference voltage.

15. The converter of claim 12 wherein the control circuit comprises:
an error amplifier having first and second inputs connected to the output terminal of the DC/DC converter and a further reference voltage, respectively, and an output terminal; and
a comparator having a first input connected to the common terminal of the first capacitor and first resistive element, and a second input coupled to the output terminal of the error amplifier.

16. The converter of claim 12, further comprising:
a second switch having a first conduction terminal connected to the terminal of the first switch, a second conduction terminal connected to the reference voltage, and a control terminal coupled to a second output of the control circuit;
a third switch having a first conduction terminal coupled to the input voltage, a second conduction terminal, and a control terminal coupled to a third output of the control circuit;
a fourth switch having a first conduction terminal coupled to the second conduction terminal of the third switch, a second conduction terminal connected to the reference voltage, and a control terminal coupled to a fourth output of the control circuit;
a second inductor connected between the second conduction terminal of the third switch and the output terminal of the DC/DC converter; and
a second resistive element and a second capacitor connected between the second conduction terminal of the third switch and the reference voltage, the second resistive element and second capacitor being connected to one another at a common terminal;
wherein the control circuit comprises:
a first error amplifier having first and second inputs connected to the output terminal of the DC/DC converter and to a further reference voltage, respectively, and an output terminal;
a first comparator having a first input connected to the common terminal of the first capacitor and first resistive element, and a second input coupled to the output terminal of the first error amplifier; and
a second comparator having a first input connected to the common terminal of the second capacitor and second resistive element, and a second input coupled to the output terminal of the first error amplifier.

17. The converter of claim 16, further comprising:
a third resistive element and a third capacitor connected between the terminal of the first switch and the reference voltage, the third resistive element and third capacitor being connected to one another at a common terminal; and a fourth resistive element and a fourth capacitor connected between the terminal of the third switch and the reference voltage, the fourth resistive element and fourth capacitor being connected to one another at a common terminal, the control circuit comprising:

a second error amplifier having a first input terminal connected with the common terminal of the third capacitor and third resistive element, a second input terminal connected directly with the output of the first error amplifier, and an output terminal; and a third error amplifier having a first input terminal connected with the common terminal of the fourth capacitor and fourth resistive element, a second input terminal connected directly with the output of the first error amplifier, and an output terminal.

18. The converter of claim 17, wherein the second input terminals of the first and second comparators are connected to the output terminals of the second and third error amplifiers, respectively.

19. The converter of claim 18, wherein the control circuit comprises means suitable for driving the first and second switches in counter-phase with respect to the third and fourth switches.

* * * * *